(No Model.) 2 Sheets—Sheet 1.
C. HAUPTMANN & J. SCHWARZ.
APPARATUS FOR MANUFACTURING MALT.
No. 479,421. Patented July 26, 1892.
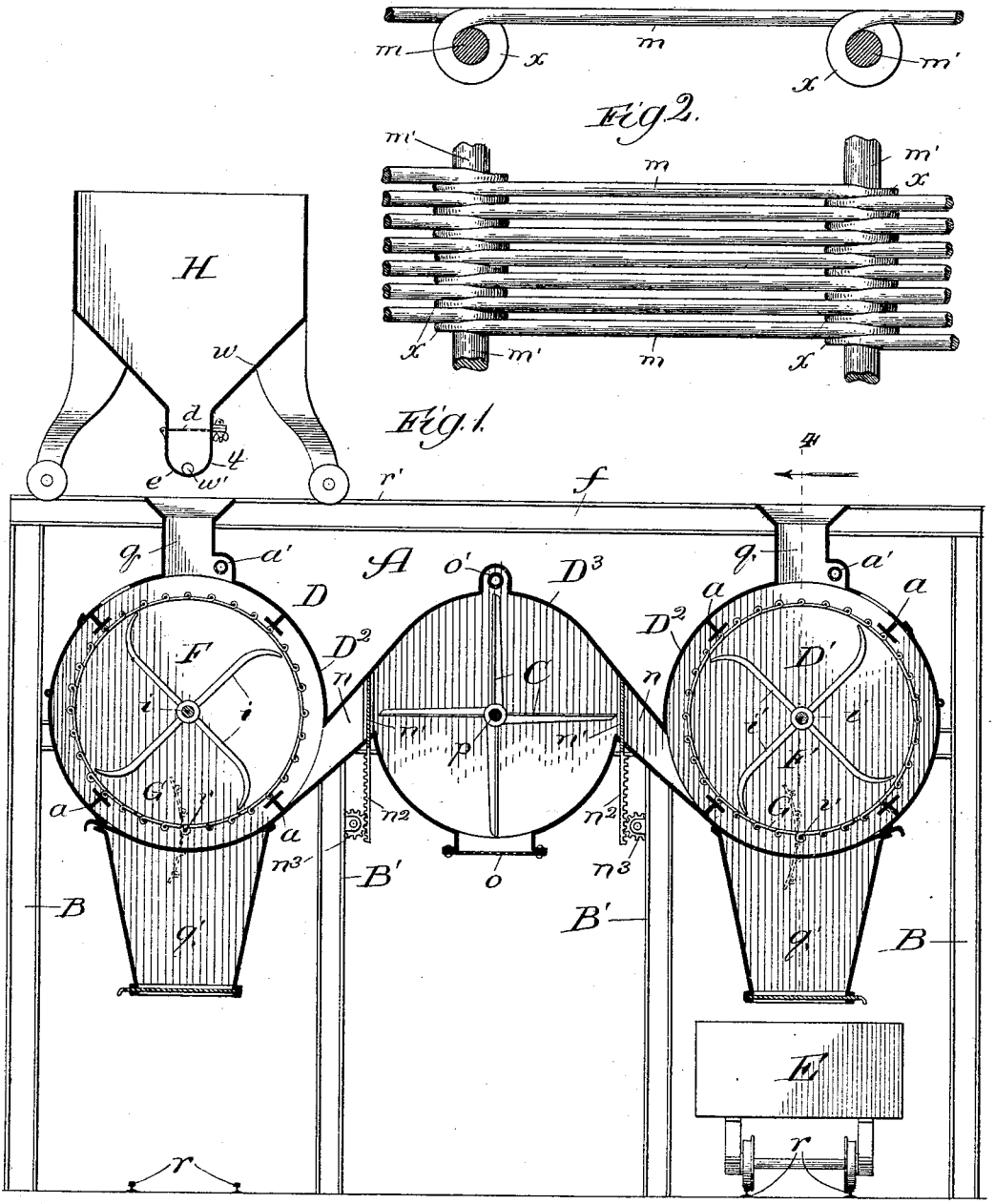
Witnesses:
Chas. E. Gaylord
Clifford N. White.
Inventors:
Charles Hauptmann,
Josef Schwarz,
By Dyrenforth & Dyrenforth
Attys.

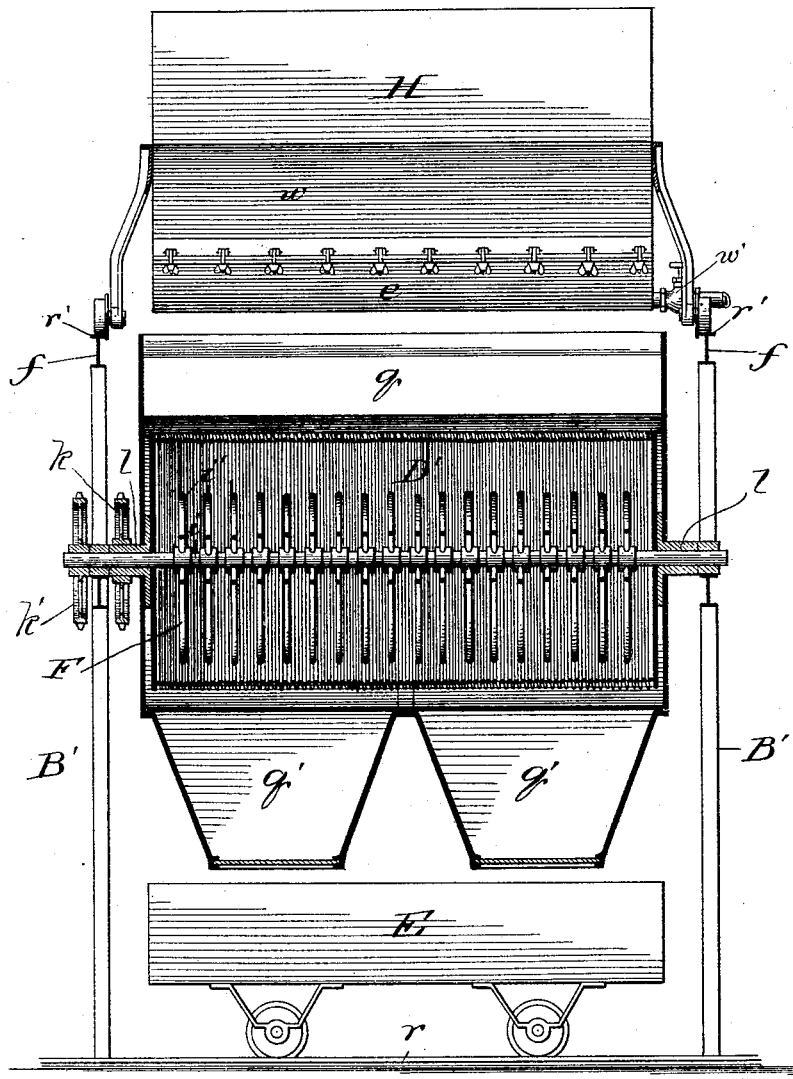

UNITED STATES PATENT OFFICE.

CHARLES HAUPTMANN AND JOSEF SCHWARZ, OF CHICAGO, ILLINOIS.

APPARATUS FOR MANUFACTURING MALT.

SPECIFICATION forming part of Letters Patent No. 479,421, dated July 26, 1892.

Application filed April 5, 1892. Serial No. 427,910. (No model.)

*To all whom it may concern:*

Be it known that we, CHARLES HAUPTMANN, a citizen of the United States, and JOSEF SCHWARZ, a citizen of Bohemia, residing at Chicago, in the county of Cook and State of Illinois, have invented a new and useful Improvement in Apparatus for Manufacturing Malt, of which the following is a specification.

Our invention relates to apparatus for the germinating proceeding in the manufacture of malt preparatory to drying it; and it involves mechanism for the treatment which enable the same to be practiced with very little manual labor, thereby expediting, simplifying, and very materially reducing the cost of the treatment. The grain used should be clean—that is, free from dust, smut, and all organic and inorganic matter that may interfere with its healthy growth or in any way contaminate it, and when not in that condition it should be cleaned. To that end, as a proceeding which may be employed when desired, we scour it. To steep the grain, which may thus form the second part of the procedure, we provide for mechanically distributing it evenly throughout the whole length of the steep-tank, and from the steep-tank the grain is mechanically transferred to a germinating-drum, wherein it is periodically turned in a peculiarly effective manner and supplied with the necessary supply of moist air at any required temperature.

By the employment of our improved apparatus we avoid handling the grain to turn it from time to time while growing, which is liable to damage it, and we also avoid the handling to change the air-supply and moisten the latter and the growing grain. We effect thorough turning of the grain in growing, thereby causing the more even germination thereof and expediting development of the germs with a superior flavor in and without molding or deterioration of the grain. Our treatment furthermore enables malting to be practiced with equal facility and with equally good results both in winter and summer, and besides requires comparatively little space in which to practice it.

Our improved apparatus is illustrated in the accompanying drawings, in which—

Figure 1 is a view in sectional end elevation of the entire apparatus. Fig. 2 is a broken plan view; and Fig. 3, a broken view, in sectional elevation, showing a detail of preferred construction. Fig. 4 is a section taken on the line 4 of Fig. 1 and viewed in the direction of the arrow.

A denotes a suitable inclosure—such as a room or compartment—of which B B may be the outer walls and B' B' inner walls or partitions, adapting the inclosure to house a set of two germinating-drums D and D', supplied with air from an interposed fan C and designed for alternate use. Each drum is shown as supported over a car-track $r$, on which moves a car E for receiving and conveying away (to a kiln) the grain after it has been germinated or "grown" in the drums, whence it is let into the car through hoppers $q'$, depending from cylindrical stationary shields $D^2$, formed, preferably, of sheet metal, to envelop the drums, and closed at their opposite ends. The fan C is enveloped by a stationary shield or shell $D^3$, and is supported on a rotary shaft $p$, adapted to be turned in either direction to supply air admitted through a screen $o$ in the base of the shell $D^3$, and which is moistened from a water-sprinkling pipe $o'$ in the top thereof to either drum D or D' (depending on the direction of rotation) through a connecting-passage $n$. While air is being supplied to one drum provision is made for closing the other to the air-supply by means of a vertically-adjustable gate $n'$, having a rack $n^2$ at its lower end worked by a pinion $n^3$, one gate device being provided for each passage $n$.

The drum is formed of open-work, and preferably of heavy wire, which should then extend circumferentially of the drum to avoid obstructing the grain while being turned or "stirred" inside it, and a desirable construction is that indicated in Figs. 2 and 3, showing wires $m$ twisted about stay-rods $m'$, provided at intervals to extend lengthwise and form the frame of the drum, the eye $x$ of each convolution being caused to project from the outer circumference of the drum, while the inner circumference is caused to present an even surface. The drum (or each drum, if two be provided, as aforesaid) is supported to rotate on hollow journals $l$, extending from its opposite closed ends, one of which journals carries a driving-pulley $k$, and inside the drum, extending lengthwise thereof, is a rotary stirrer F, comprising a shaft passing at opposite ends through and supported in the hollow drum-journals $l$, one end carrying a driving-pulley $k'$.

The supply of steeped grain to be germinated is admitted into the drum through a hopper $q$, leading into it through the top of the inclosure A, and to admit the grain into the drum the latter is provided with a gate G, forming a segment of its circumference and supported at its center on a pivot $v$, extending lengthwise of the drum, whereby the gate may be swung to the dotted vertical position (see Fig. 1) to open it for admission or discharge of the contents of the drum, and closed by turning it to the position shown by its full-line representation. It is to be understood, of course, that for filling the drum it is turned to bring the gate G below the hopper $q$, and that to empty it the gate is brought by turning the drum into alignment with the lower hopper $q'$.

H is a steep-tank, which should correspond in length with that of a drum, and the dimensions of which should adapt it to contain a charge of grain sufficient to fill the drum to the extent desired, besides the supply of steeping-water, which may be discharged at will through a cock $w'$ in the apex of the hopper-shaped base $w$ of the steep-tank. Where two drums are employed, as hereinbefore mentioned, we prefer to provide the steep-tank with wheels to run upon a track $r'$ on the floor $f$ and thus facilitate its locomotion to a position over the hopper $q$ of either drum. The base of the apex $t$ is in the form of a hinged trough-shaped gate $e$, fastened and unfastened by any suitable means—such as the bolts and thumb-nuts represented—and covered by a strainer $d$.

The operation is as follows: Ice or other cooling means, if the weather be warm, should be provided on top of the shield $D^3$ of the fan C to cool the moist-air supply, and warm moist air should be provided if the weather be cold, according to requirement, for proper germination. In the steep-tank H the grain is steeped in the usual or any suitable manner. On discharging the water employed for the steeping from the tank the gate $e$ is opened, permitting the steeped grain to be deposited in a drum through a hopper $q$, the drum-gate G having previously been brought into proper position and opened for the purpose. On then closing the drum-gate G the drum is ready to be turned at suitable intervals, each turning of the drum in one direction being accompanied by turning the shaft of the stirrer F in the opposite direction, and by rotating the cam C at a faster speed—say four times that of the drum and its contained stirrer—in the proper direction to force air, moistened from the pipe $o'$, through a passage $n$ into the drum and through its contents, suitable outlets for the air from the drum being provided in the shields $D^2$, preferably, as shown in Fig. 1, diametrically opposite the air-inlets $n$.

An important feature of our construction consists in deflectors $a$ (shown in Fig. 1) in the form of T-bars, extending at intervals between the drum and its inclosing envelope $D^2$ to obstruct circulation of the air-supply about the exterior of the drum and deflect it through the latter and its contents.

When the grain in the drum has been adequately grown, it is turned to bring the gate G over the hoppers $q'$, into which the grain is discharged in opening the gate and from which it is introduced into, say, a car E.

Where two drums are provided, while one is being emptied and subsequently cleaned (for which latter purpose water may be supplied through pipes $a'$) the other may be filled and operated in the manner already described, or both drums may be used simultaneously. We do not, however, wish to be understood as limiting our apparatus to the employment of more than one drum, which is suggested only as being convenient and facilitating the procedure; nor do we desire in other respects to be understood as limiting our improved apparatus to the details of construction shown and described, as these may be variously modified without materially, if at all, affecting the operation or departing from the spirit of our invention.

What we claim as new, and desire to secure by Letters Patent, is—

1. In a malting apparatus, the combination of a perforate rotary drum forming the grain-receptacle and having a gate and enveloped in a stationary casing having a supply-inlet and discharge-outlet, a rotary stirrer in the drum, adapted to be rotated contrary thereto, and means for supplying moist air to the drum, substantially as described.

2. In a malting apparatus, the combination of a perforate rotary drum having a gate G and inclosed in a casing $D^2$, having a supply-inlet $q$ and a discharge-outlet $q'$, deflectors $a$, interposed at intervals between the drum and its envelope, a rotary stirrer F in the drum, and a fan C, communicating with the drum through its said casing, substantially as described.

3. In a malting apparatus, the combination, with an inclosure A, of a circumferentially perforate rotary drum having a gate G and inclosed in a casing $D^2$, having a supply-inlet $q$ and a discharge-outlet $q'$, a rotary stirrer F in the drum, adapted to be rotated in the direction contrary to the rotation of the drum, and a fan C, communicating with the drum through the said casing and forming a support in the said inclosure for stored ice, substantially as described.

4. In a malting apparatus, the combination, with an inclosure A, of rotary drums D and D', each having a gate G and being inclosed in a casing $D^2$, having a supply-inlet $q$ and a discharge-outlet $q'$, a rotary stirrer F in each drum, adapted to be rotated in the direction contrary to that of the drum, and a fan C, interposed between and controllably communicating with the two drums, substantially as described.

5. A malting apparatus comprising, in combination with an inclosure A, a steep-tank car H on a track $r'$ above the said inclosure, rotary drums D and D', each having a gate G and being inclosed in a casing $D^2$, having an upper supply-hopper $q$ and a lower discharge-hopper $q'$, a rotary stirrer F in each drum, deflectors $a$, provided at intervals around the drums inside their said casings, and a fan C, interposed between and controllably communicating with the two drums and having an air-straining inlet and a water-supply pipe in its casing $D^3$, the whole being constructed and arranged to operate substantially as described.

CHARLES HAUPTMANN.
JOSEF SCHWARZ.

In presence of—
M. J. FROST,
W. N. WILLIAMS.